(12) United States Patent
Nyland (10) Patent No.: US 7,752,799 B2
(45) Date of Patent: Jul. 13, 2010

(54) ARM SUPPORT FOR USE WITH AN ELONGATED ITEM SUCH AS A FISHING ROD

(76) Inventor: Thomas John Nyland, 3025 Eagandale Pl., No. 221, Eagan, MN (US) 55121

( * ) Notice: Subject to any disclaimer, the term of this patent is extended or adjusted under 35 U.S.C. 154(b) by 0 days.

(21) Appl. No.: 11/438,096

(22) Filed: May 19, 2006

(65) Prior Publication Data

US 2007/0000165 A1    Jan. 4, 2007

Related U.S. Application Data

(63) Continuation-in-part of application No. 10/848,829, filed on May 19, 2004.

(51) Int. Cl.
*A01K 97/10* (2006.01)
(52) U.S. Cl. ........................................... 43/21.2; 43/25
(58) Field of Classification Search .................. 43/21.2, 43/25; 224/222
See application file for complete search history.

(56) References Cited

U.S. PATENT DOCUMENTS

| | | | |
|---|---|---|---|
| 2,146,350 A * | 2/1939 | Roberts | 224/200 |
| 2,158,104 A | 5/1939 | Bowen | |
| 2,244,408 A * | 6/1941 | Thompson | 43/25 |
| 2,727,707 A * | 12/1955 | Wells | 248/514 |
| 2,869,276 A | 1/1959 | Hagen | |
| 3,053,004 A * | 9/1962 | Baker | 43/25 |
| 3,159,939 A | 12/1964 | Transeau | |
| 3,367,056 A | 2/1968 | Johnson | |
| 3,372,510 A | 3/1968 | Arsenault | |
| 4,014,129 A | 3/1977 | Capra | |
| 4,190,977 A | 3/1980 | Casper | |
| 5,159,775 A | 11/1992 | Sutula, Jr. | |
| 5,212,900 A | 5/1993 | Perry | |
| 5,313,735 A * | 5/1994 | Latouche | 43/25 |
| 5,390,438 A | 2/1995 | Warren, Jr. | |
| 5,941,012 A | 8/1999 | Dominguez | |
| 6,065,240 A | 5/2000 | Paddock | |
| 6,295,755 B1 * | 10/2001 | Macaluso | 43/25 |
| 6,493,982 B1 | 12/2002 | Macaluso | |

OTHER PUBLICATIONS

"What is Turboset?", America's Fishing Device Inc., 2 pages (Mar. 2005).

* cited by examiner

*Primary Examiner*—Christopher P Ellis
(74) *Attorney, Agent, or Firm*—Merchant & Gould P.C.

(57) ABSTRACT

An arm support for use with an elongated item such as a fishing rod is disclosed herein. The arm support device includes an arm cradle that mounts above a handle of the elongated item. The arm cradle is adapted for supporting a person's forearm. The arm cradle can be pivoted relative to the handle to allow the arm cradle to stay in contact with the person's forearm as the person bends his or her wrist to change the lateral angle defined between the person's forearm and the elongated item.

16 Claims, 7 Drawing Sheets

ARM SUPPORT FOR USE WITH AN ELONGATED ITEM SUCH AS A FISHING ROD

CROSS-REFERENCE TO RELATED APPLICATION

This application is a continuation-in-part of U.S. patent application Ser. No. 10/848,829, filed May 19, 2004, which application is hereby incorporated by reference in its entirety.

TECHNICAL FIELD

The principles disclosed herein relate to fishing equipment. More particularly, the disclosure relates to arm support devices for use with fishing rods.

BACKGROUND

Fishing has become increasingly popular at both the professional and recreational level. Fishing success at all levels can be hampered by an angler's inability to effectively handle a fishing rod. For example, improper technique and rod control can lead to poor casting accuracy and poor hook setting. Also, the inability to maintain the rod tip at a high location while playing a fish can lead to lost fish. Moreover, many anglers experience tired wrists after extended periods of fishing because traditional fishing rods provide relatively low amounts of leverage.

SUMMARY

One inventive aspect of the disclosure relates to an arm support device for use with a fishing rod that increases an angler's leverage while being comfortable and easy to use.

Another inventive aspect of the disclosure relates to an arm support device for use with an elongated object (e.g., a fishing rod) that is laterally moveable to enhance comfort and ease of use. In certain embodiments, the arm support device can have a threaded pivot pin that is threaded within a coupler used for securing the arm support device to the handle. In other embodiments, the arm support device can include a forearm support that is connected to a coupler by a quick release pivot pin configuration.

A further aspect of the disclosure relates to an arm support kit having a pivotal forearm support that can be used with multiple couplers.

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventive concepts underlying the embodiments disclosed herein.

DETAILED DESCRIPTION

Figure 1:
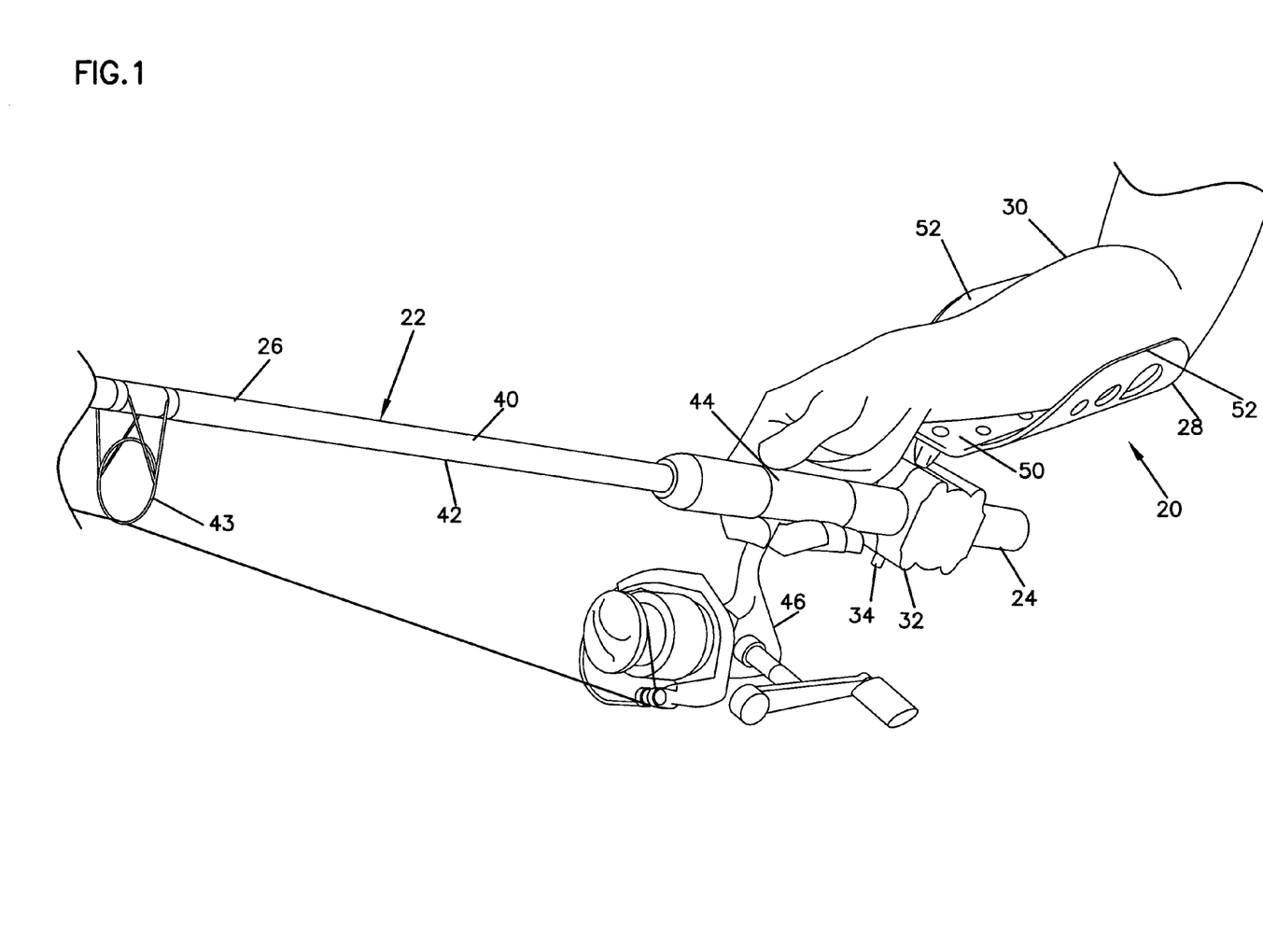
FIG. 1 is a perspective view of an arm support device having features that are examples of inventive aspects in accordance with the principles of the present disclosure, the arm support device is shown in combination with a fishing rod.

FIG. 1 illustrates an arm support device 20 having features that are examples of inventive aspects in accordance with the principles of the present disclosure. The arm support device 20 is shown in combination with a fishing rod 22 including a handle 24 and a shaft 26. The arm support device 20 includes an arm cradle 28 adapted for supporting a forearm 30 of an angler as the angler grasps the handle 24 of the fishing rod 22. The arm support device 20 also includes a clamp 32 fastened to the handle 24, and a pivot pin 34 that pivotally connects the arm cradle 28 to the clamp 32. The configuration of the arm support device greatly improves the angler's leverage when the angler is playing a fish and setting the hook. Furthermore, the pivot pin 34 allows the cradle 28 to be easily positioned to the particular angle of comfort desired by the angler, and/or to freely pivot with the angler's forearm 30 as his or her wrist bends.

Referring still to FIG. 1, the fishing rod 22 is depicted as a conventional spinning rod having a top side 40 and a bottom side 42. The spinning rod includes eyelets 43 positioned at the bottom side 42 of the rod 22. The fishing rod 22 also includes a reel mount 44 positioned at the handle 24 for mounting a spinning reel 46 beneath the bottom side 42 of the rod 22. While the arm support device 20 has been shown with a conventional spinning rod, it will be appreciated that the arm support device 20 could also be used with other types of fishing rods such as bait casting or spin casting rods. Bait casting and spin casting rods typically have reels and eyelets mounted on the top sides of the rods. It will also be appreciated that, while a preferred use for the arm support device 20 is with respect to fishing rods, the device can also be used to improve leverage with respect to any type of elongated device having a handle where improved leverage and control of the device is desirable.

Figure 2:
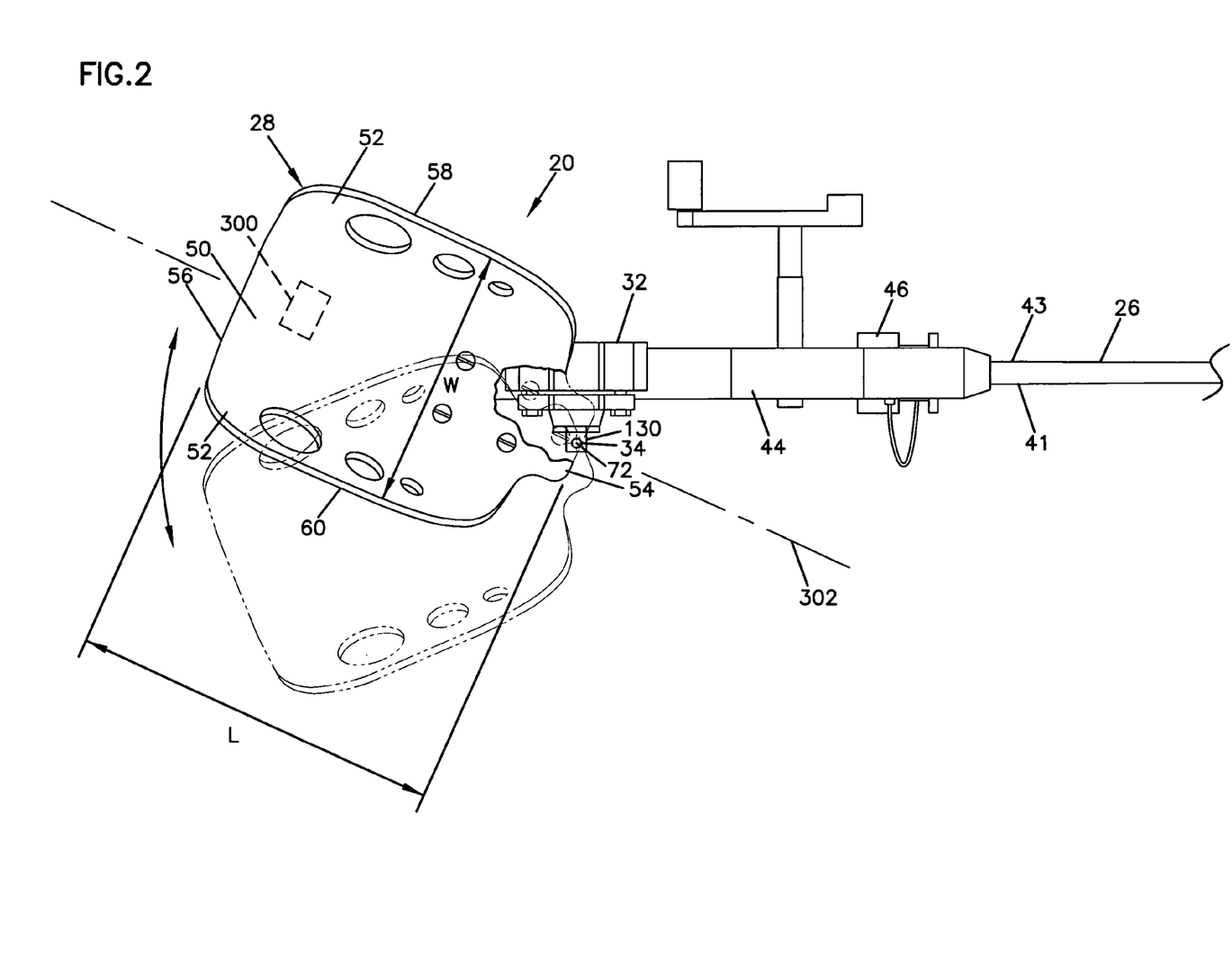
FIG. 2 is a top view of the arm support device and fishing rod of FIG. 1.
Figures 3, 4:
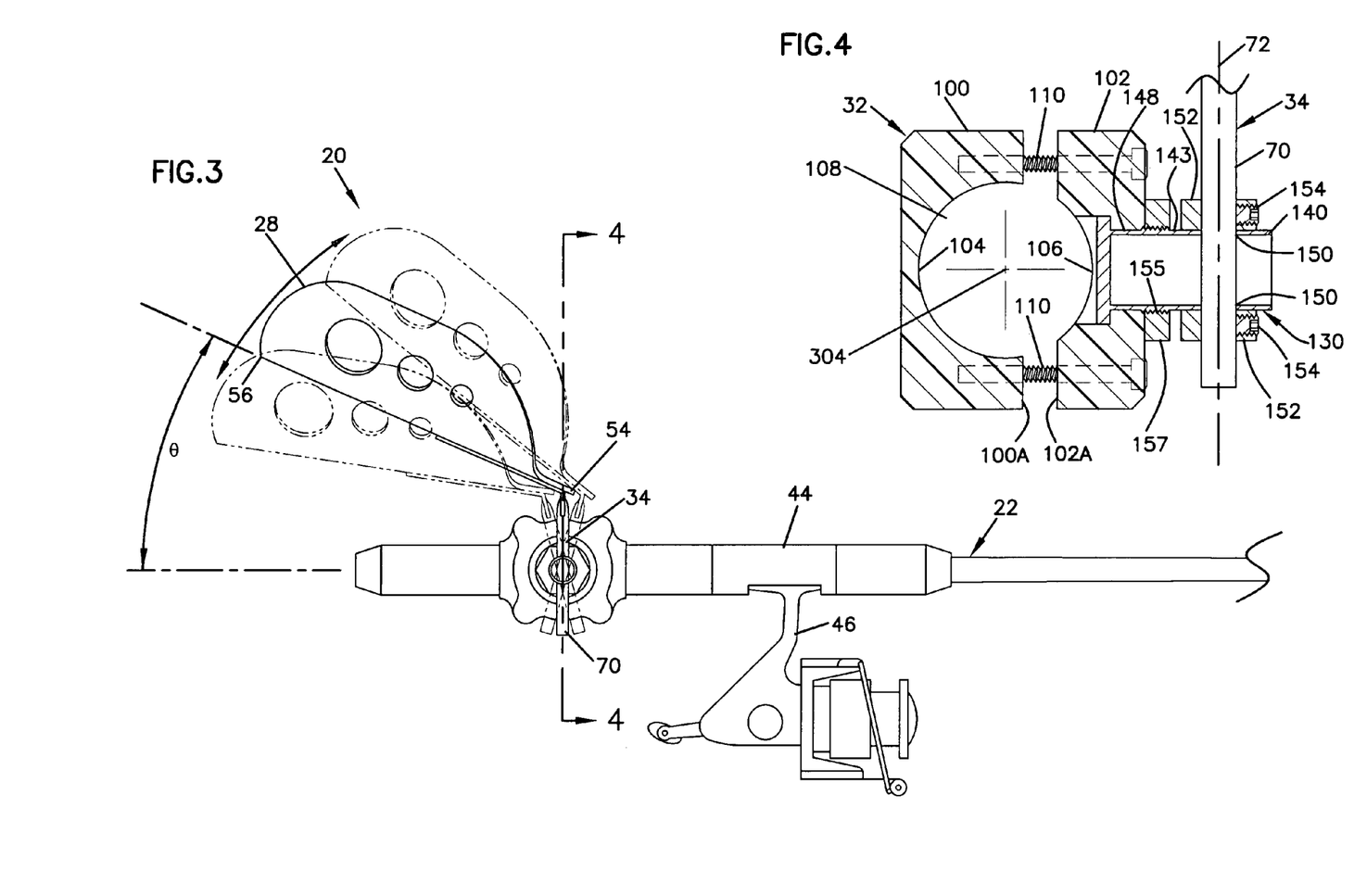
FIG. 3 is a side view of the arm support device and fishing rod of FIG. 1.
FIG. 4 is a cross-sectional view taken along section line 4-4 of FIG. 3.

As shown in FIGS. 1-3, the arm cradle 28 of the arm support device 20 preferably mounts above the top side 40 of the fishing rod 22 at a location rearward of the reel mount 44. When connected to the rod 22, the arm cradle 28 preferably opens in an upwardly direction such that the angler's forearm can easily be inserted downwardly therein with minimal difficulty. In certain embodiments, a strap (e.g., a Velcro strap or a strap with a fastener such as a buckle) can be used to secure the angler's forearm 30 within the cradle 28.

Referring to FIG. 2, the arm cradle 28 includes a base portion 50 and opposing sidewalls 52 that curve upwardly from the base portion 50 so as to define an upwardly facing channel. The arm cradle 28 includes a front end 54 positioned opposite from a back end 56, and a left side 58 positioned opposite from a right side 60. A length L of the arm cradle 28 is defined between the front and back ends 54, 56, and a width W of the arm cradle 28 is defined between the left and right sides 58, 60. As best shown in FIGS. 1 and 3, the arm cradle 28 preferably inclines upwardly from the fishing rod 22 as the arm cradle extends from the front end 54 to the back end 56.

It is preferred for the length L of the cradle 28 to be longer than the width W of the cradle. In one embodiment, the length L is at least 1.5 times longer than the width W. In another embodiment, the length L is equal to or greater than 2 times the width W. In a preferred embodiment, the length is in the range of 5 to 12 inches, and the width W is in the range of 4 to 6 inches. Of course, sizes outside the specified ranges are also included within the scope of the present invention.

It is preferred for the arm cradle 28 to be made of a relatively light material such as plastic. By selecting a desired weight, the arm support device 20 can be used to effectively balance the fishing rod 22. In certain embodiments, weighting devices 300 can be added to or removed from the arm cradle 22 to provide customized weight suitable for the angler. For example, the weight devices 300 can be adhesively affixed or otherwise secured to the underside of the cradle 28.

Referring to FIG. 3, the pivot pin 34 of the arm support device 20 is connected to the arm cradle 28 at a location adjacent to the front end 54 of the arm cradle 28. The pivot pin 34 includes a pivot shaft 70 that extends downwardly from the front end of the arm cradle 28 to the clamp 34. The pivot shaft 70 is preferably free to pivot relative to the clamp 32 about a pivot axis 72 (see FIG. 4). As shown in FIG. 2, the pivot axis 72 is offset to a right side 41 of the fishing rod 22 and a central longitudinal axis 302 of the arm cradle 28 intersects the pivot axis 72. As also shown at FIG. 2, the length L of the arm cradle 28 extends generally radially outwardly from the pivot axis 72. With the pivot axis 72 offset to the right side 41 of the fishing rod 22, the arm support device 20 is most preferably suited for right-handed anglers that grasp the reel 46 with their right hand as shown in FIG. 1. For left-handed anglers, the pivot axis 72 is preferably offset to a left side 43 of the fishing rod 22.

FIG. 2 shows the arm cradle 28 being laterally pivoted relative to the fishing rod 22. In certain embodiments, the pivot pin 34 is configured to freely pivot relative to the clamp 34 so that the cradle 28 can follow the angler's forearm as the angler bends his or her wrist. In other embodiments, the pin 34 can frictionally engage the clamp 32 with sufficient tension to allow the cradle 28 to be manually pivoted to a desired angle relative to the rod 22, and then to maintain the desired angle until the angler decides to re-adjust the angle. In certain embodiments, a locking structure such as a set screw or other means can be used to lock the cradle 28 at the angle preferred by the angler.

Referring to FIG. 4, the clamp 32 includes first and second pieces 100 and 102 having inner sides 100A and 102A that oppose one another. The inner sides 100A and 102A includes recesses 104 and 106 that cooperate to define a receptacle 108 for receiving the handle 24 of the fishing rod 22. The receptacle 108 has a central axis 304. To mount the handle 24 within the clamp 32, the pieces 100, 102 are positioned on the left and right sides 41, 43 of the fishing rod 22 and are pressed together such that the handle 24 is captured within the receptacle 108. The pieces 100, 102 are then clamped together by fasteners such as bolts 110 that draw the pieces 100, 102 together such that the handle 24 is firmly clamped within the receptacle 108.

As shown in FIGS. 2 and 4, the second piece 102 of the clamp 32 includes a structure 130 for receiving the pivot shaft 70 of the pivot pin 34. By selectively mounting the second piece 102 on either the left side or the right side of the fishing rod 22, the arm support device 20 can be configured to be used by either a right-handed or a left-handed fisherman.

Referring again to FIG. 4, the structure 130 for receiving the pivot shaft 70 includes a shank 140 having a head 142. The head 142 seats within a pocket 146 defined within the second piece 102 of the clamp 32. A main body 143 of the shank extends from the pocket 146 through a clearance opening 148 to a region located exterior of the second piece 102. The shank 140 also defines an opening 150 through which the pivot pin extends. The pivot pin 70 can preferably rotate within the opening 150 to allow the arm cradle 28 to be pivoted to the left and right relative to the fishing rod 22. Fasteners such as collars 152 having set screws 154 can be mounted on the pivot pin 70 above and below the shank 140 to prevent the shaft 70 from being unintentionally removed from the opening 150. In alternative embodiments, the fasteners can be eliminated such that the pivot shaft 70 can be readily inserted into or removed from the opening 150.

The structure 130 is also configured to allow the angle of incline of the arm cradle 28 to be adjusted relative to the fishing rod 22. For example, the shank 140 includes a threaded portion 155 on which a nut 157 is mounted. By tightening the nut 157 on the threaded portion 155, the shank 140 can be clamped relative to the second piece 102 such that the opening 150 is locked at a position corresponding to the desired angle θ of the arm cradle 28 relative to the rod 22. To adjust the angle θ, the nut 157 is loosened to allow the shank 140 to be turned or pivoted about its longitudinal axis to increase or decrease the angle θ relative to the rod 22. FIG. 3 shows the arm cradle 28 in phantom line positioned at several different incline angles relative to the rod. It will be appreciated that angle θ can also be adjusted by bending the pivot shaft 70 at location 158. In certain embodiments, the angle θ is in the range of 0-45 degrees. In other embodiments, the angle is in the range of 15-30 degrees.

In one embodiment, the head 142 of the shank 140 and the pocket 146 are circular in transverse cross-section. In other embodiments, the head 142 and the pocket can have mating shapes with flats, projections or other structures that allow the head 142 to be positioned at a plurality of discrete rotational positions within the pocket 144. Each discrete rotational position corresponds to a different angle of incline of the cradle 28.

Figure 5:
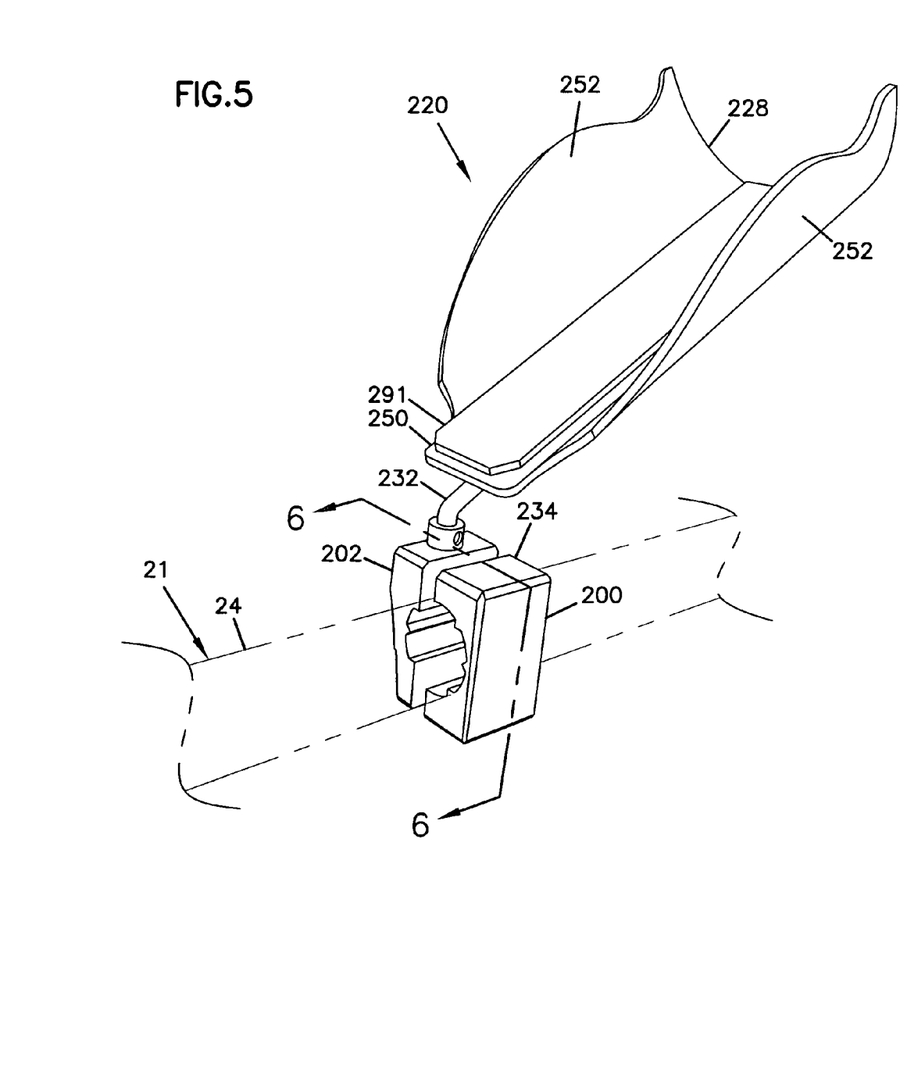
FIG. 5 is a perspective view of an alternative rod support device having features that are examples of inventive aspects in accordance with the principles of the present disclosure.

FIGS. 4 and 5 illustrate an alternative arm support device 220 having features that are examples of inventive aspects in accordance with the principles of the present disclosure. The arm support device 220 includes an arm cradle 228 connected to a clamp 234. The clamp 234 is adapted to be secured to the handle 24 of the fishing rod 22.

Referring to FIG. 5, the arm cradle 228 includes a base portion 250 and two side walls 252. An arm cushioning member 291 is secured to the base 250. A pivot pin 232 is mounted to the front end of the arm cradle 228.

Figure 6:
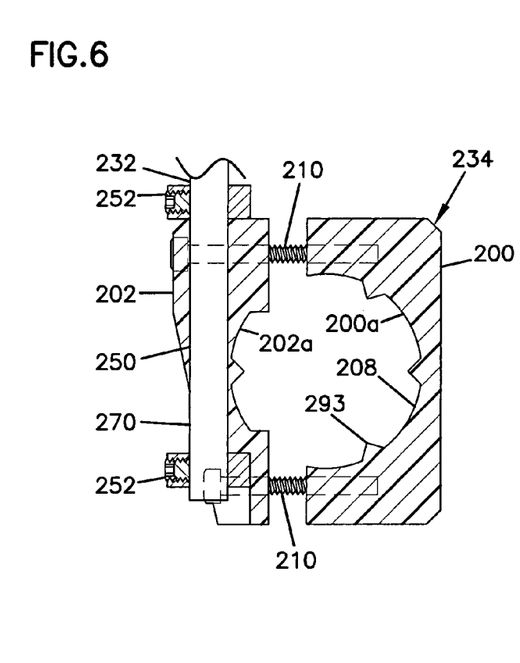
FIG. 6 is a cross-sectional view taken along section line 6-6 of FIG. 5.

Referring to FIGS. 5 and 6, the clamp 234 includes first and second clamp pieces 200, 202. In certain embodiments, the clamp pieces 200, 202 are made of a plastic/polymeric material such as polycarbonate. The clamp pieces 200, 202 define opposing inner surfaces 200a, 202a which cooperate to define an interior channel or receptacle 208 for receiving the rod handle 24. The pieces 200, 202 include gripping projections 293 that project radially into the receptacle 208. The projections 293 are adapted to press into the handle 24 of the fishing rod 22 to resist relative rotational movement between the handle 24 and the clamp 234. Fasteners 210 such as screws or bolts or other fasteners are used to draw the clamping members 200, 202 together to clamp the handle 24 within the receptacle 208.

Referring to FIG. 6, the clamp 234 defines a generally upright pivot opening 250 that extends through the second clamping member 202 at a location laterally offset from the handle receptacle 208. The pivot opening 250 is adapted to pivotally receive a lower pivot shaft 270 of the pivot pin 232. Fasteners 252 can be used to prevent the pivot pin 232 from inadvertently being withdrawn from the pivot opening 250.

Figure 7:
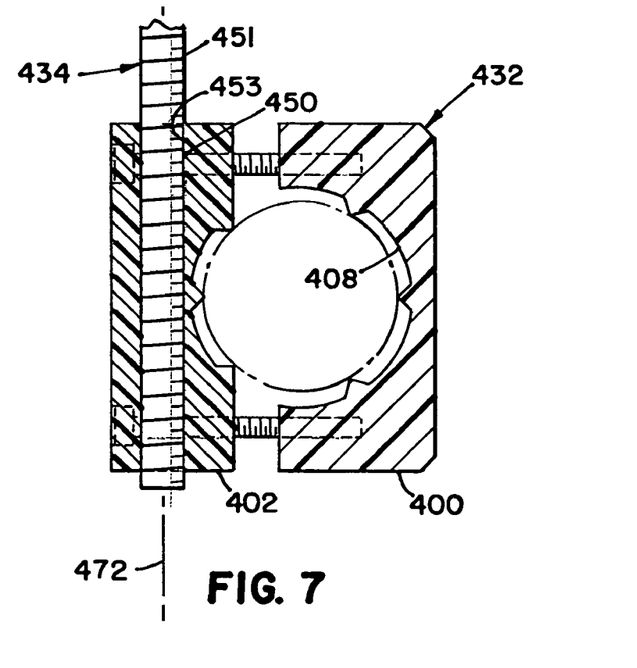
FIG. 7 is a cross-sectional view of an alternative pivot pin mounting configuration adapted for use with an arm support device in accordance with the principles of the present disclosure.

FIG. 7 shows an alternate pin mounting configuration in accordance with the principles of the present disclosure for mounting an arm cradle (e.g., arm cradle 228, arm cradle 28, or other type of arm engaging/supporting structure) to a coupler such as clamp 432. The clamp 432 includes first and second clamp pieces 400, 402. The clamp pieces 400, 402 define an interior receptacle 408 (e.g., a pocket, channel, groove, slot or other structure) for receiving a handle of an elongate item. The clamp 432 also defines a generally upright pivot opening 450 that extends through the second clamping member 402 at a location laterally offset from the receptacle 408. The pivot opening 450 is adapted to pivotally receive a lower end of a pivot pin 434. The pivot pin 434 is connected to the front end of a forearm engaging member (e.g., a cradle such as cradles 28, 228 or any other type of structure suitable for engaging a person's forearm) with the lower end portion of the pivot pin 434 extending downwardly from the forearm engaging member and an upper end portion secured to a base of the forearm engaging member. In one embodiment, the pin 434 can define an angle between the upper and lower portions similar to the pin 34. The pivotal relationship between the pivot pin 434 and the opening 450 allows the forearms engaging member to pivot about pivot axis 472 relative to the clamp 432. It will be appreciated that other types of couplers can also be used.

The pivot pin 434 and the opening 450 have interlocking structures that allow the pivot pin 434 to pivot within the opening 450, but also prevent the pivot pin 434 from inadvertently/unintentionally being pulled axially from the opening 450. For example, the pivot pin 434 is shown including male threads 451 that thread within corresponding female threads 453 defined inside the opening 450. To mount the pivot pin 434 within the opening 450, the lower end of the pivot pin 434 is inserted in the opening 450 and the pivot pin 434 is rotated in a first direction (e.g., clockwise) about the pivot axis 472 to thread the lower end of the pivot pin 434 down into the opening 450. The pivot pin 434 continues to be rotated in the first direction until the cradle is located at a desired height above the clamp 432. The device is then ready for use.

In use, the threaded relationship between the opening 450 and the pivot pin 434 allows the forearm engaging member to be pivoted about a pivot axis 472 relative to the clamp 432, but also prevents the pivot pin 434 from being slid axially out of the opening 450. As the pivot pin 434 is pivoted within the opening 450, the threads 451 ride along the threads 453. To remove the pivot pin 434 from the opening 450, the pivot pin 434 can be rotated in a second direction (e.g., counterclockwise) about the pivot axis 472 so as to unthread the pivot pin 434 from the opening 450.

It will be appreciated that the threads 453 can be pre-tapped in the opening 450 prior to threading of the lower end of the pivot pin 434 within the opening 450. Alternatively, the pivot pin 434 can be self tapping so that the threads 451 cut the threads 453 along the opening 450 as the pivot pin 434 is threaded therein.

Figures 8, 9:
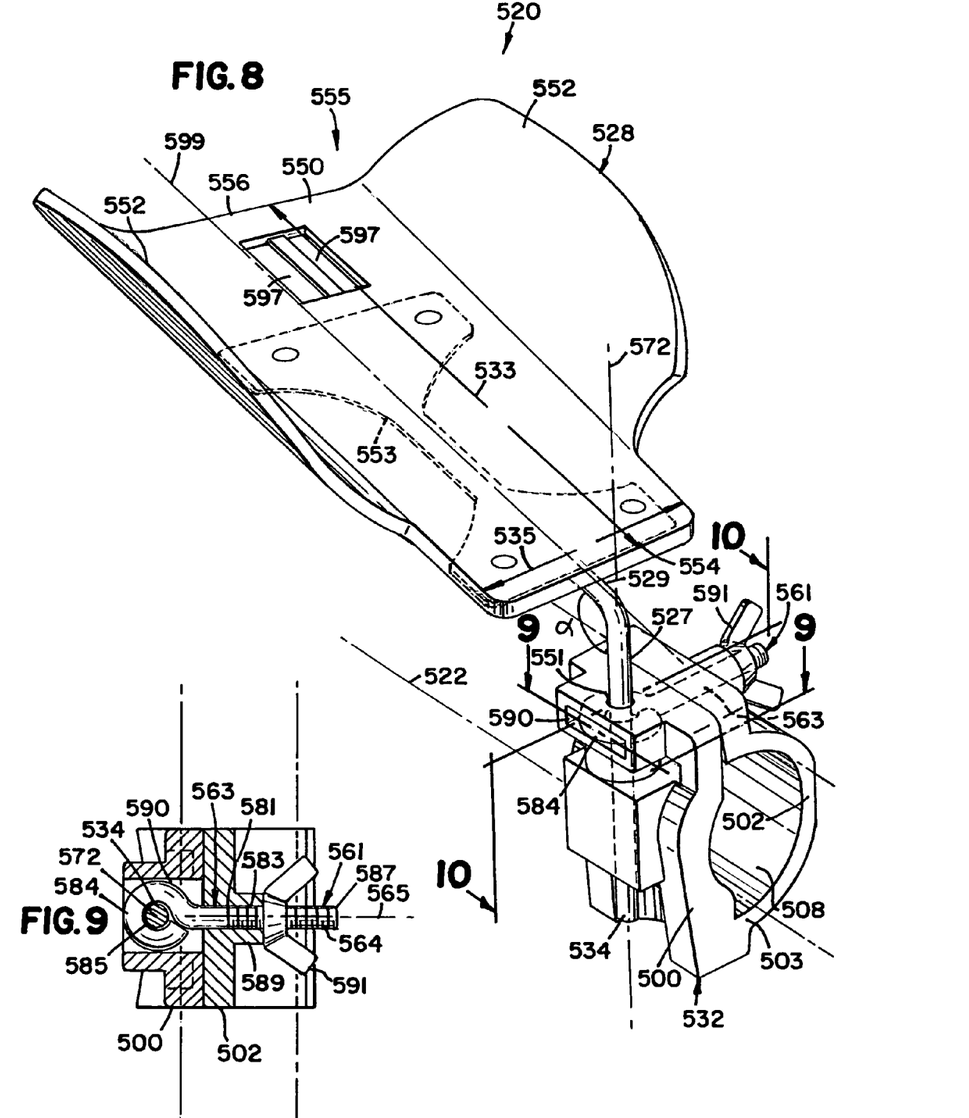
FIG. 8 is a perspective view of a further arm support device having features that are examples of inventive aspects in accordance with the principles of the present disclosure.
FIG. 9 is a cross-sectional view taken along section line 9-9 of FIG. 8.

FIG. 8 illustrates another arm support device 520 having features that are examples of inventive aspects in accordance with the principles of the present disclosure. The arm support device 520 includes a forearm engaging member such as an arm cradle 528. The arm support device also includes a coupler such as a clamp 532 for mounting the arm support device 520 to the handle of an elongated item 522 such as a fishing rod or fishing net. The arm cradle 528 is pivotally connected to the clamp 532 by a pivot pin 534 that is configured to allow the arm cradle 528 to pivot relative to the clamp 532 about a pivot axis 572. Similar to the previous embodiments, the pivotal movement provided by the pivot pin 534 allows the cradle 528 to be easily positioned at the particular lateral angle of comfort relative to the handle desired by the user. The pivot pin 534 also allows lateral relative pivotal movement to be generated between the handle and the cradle 528 as the user bends his or her wrist. In this manner, the arm cradle 528 remains in contact with the person's forearm as the person bends his or her wrist to change the side angle of the user's forearm relative to the elongated item.

Referring to FIG. 8, the arm cradle 528 includes a base portion 550 and opposing sidewalls 552 that curve upwardly from the base portion 550 so as to define an upwardly facing channel 555. The arm cradle 528 includes a front end 554 positioned opposite from a back end 556. A first dimension 533 of the arm cradle 528 extends from the open front end 554 to the open back end 556. A second dimension 535 is aligned generally perpendicular to the first dimension 533 and extends between the opposing sidewalls 552. In use of the cradle, a user's forearm is adapted to align generally parallel to the first dimension 533 when received within the channel 555 of the cradle 528. Slots 597 are provided through the base portion 550 for receiving a strap (e.g., a Velcro strap) used to strap the person's forearm in the channel.

The pivot pin 534 is depicted having a one-piece construction includes a lower end portion 527 that is unitarily with an upper end portion 529. An angle $\alpha$ is defined between the lower and upper end portions 527, 529. In one example embodiment, the angle $\alpha$ is in the range of 105-135 degrees. The angle $\alpha$ causes the base portion 550 of the arm cradle 538 to incline as the base portion 550 extends generally radially away from the pivot axis 572 along the first dimension 533.

The first dimension 533 of the arm cradle 528 extends generally radially outwardly from the pivot axis 572. In the depicted embodiment, the arm cradle 528 is oriented such that a central longitudinal axis 599 of the arm cradle 528 intersects the pivot axis 572. As shown at FIG. 8, the central longitudinal axis 599 extends along the first dimension 533 of the arm cradle 528. In use of the arm support device 520, a user's forearm is positioned within the arm cradle 528 generally parallel to the first dimension 533, and the pivot axis 572 intersects the user's arm. In a preferred embodiment, the pivot axis 572 extends through a user's wrist region (in the same manner depicted in the embodiment of FIG. 1). In this manner, when the user bends his or her wrist to change the angle of his or her forearm relative to the elongated item 522, relative pivotal movement is generated between the elongated item 522 and the arm cradle 528 so that the arm cradle 528 stays in contact with the user's forearm as the wrist is bent.

As depicted in FIG. 8, the upper end portion 529 of the pivot pin 534 is mounted to the underside of the arm cradle 528. For example, the upper end portion 529 of the pivot pin 534 is shown connected to a bracket 553 fastened to the underside of the arm cradle 528 by fasteners (e.g., rivets, screws or other fasteners). In certain embodiments, the upper end portion 529 of the pivot pin 534 can be welded or otherwise secured to the bracket 553. In still other embodiments, the pivot pin 534 can be integrally formed as a single unitary piece with the arm cradle 528.

The lower end portion 527 of the pivot pin 534 is pivotally received within an opening 551 defined by the clamp 532 and defines the pivot axis 572. As shown at FIG. 8, the lower end portion 527 of the pivot pin 534 extends downwardly from the arm cradle 528 to the clamp 532 at a location adjacent the front end of the arm cradle. In the depicted embodiment, the pivot axis 572 is positioned slightly in front of the front end 554 of the arm cradle 528.

Figure 10:
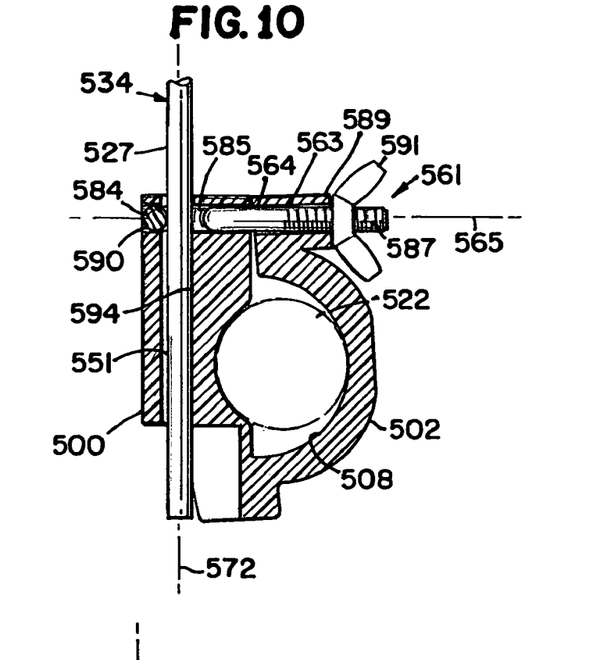
FIG. 10 is a cross-sectional view taken along section line 10-10 of FIG. 8.

Referring still to FIG. 8, the clamp 532 includes a clamping member having a first portion 500 and an opposing second portion 502 that cooperate to define a receptacle 508 for receiving the elongated item. The first and second portions 500, 502 are connected at a living hinge 503 that allows the first portion 500 to flex relative to the second portion 502. The living hinge 503 is positioned below the receptacle 508. The pivot pin opening 551 (e.g., a bore) is defined by the first portion 500 of the clamp 532. The pivot pin opening 551 is laterally offset from the receptacle 508 of the clamp 532 and extends in a generally upward/downward direction. The opening 551 is sized to pivotally receive the lower end portion 529 of the pivot pin 534. A quick release fastener 561 is used to retain the lower end portion 529 of the pivot pin 534 in the pivot opening 551 of the clamp 532. For example, as shown at FIG. 8, the quick release fastener 561 includes a retention member such as an eye-bolt 563 having a shaft 564 defining an axis 565 that extends across the pivot pin opening 551. As shown at FIG. 10, the axis 565 is transversely aligned relative to the pivot axis 572 and is located above the receptacle 508. As described below, the fastener 561 provides a dual function of tightening the clamp 532 about the handle of the elongated item 522, and also retaining the lower end portion 529 of the pivot pin 534 in the pivot opening 551.

As shown at FIGS. 8-10, the eye-bolt 563 is mounted within an opening 581 that extends through the first and second portions 500, 502 of the clamp at a location above the receptacle 508. The opening 581 extends across the pivot opening 551 and includes a bore portion 583 that extends through the second portion 502 of the clamp 532 and a pocket portion 590 (e.g., a rectangular slot) that extends through the first portion 500 of the clamp 532. A shaft 564 of the eye-bolt 563 is mounted in the bore portion 583 of the opening 581. The eye-bolt also includes an eye portion 584 defining an opening 585 that generally coaxially aligns with the pivot opening 551 of the clamp 532. The eye portion 584 fits within the pocket portion 590 of the opening 581. As shown at FIG. 9, the pocket portion 590 has an enlarged width as compared to the bore portion 583 of the opening 581.

When the lower end portion 529 of the pivot pin 534 is inserted through the pivot opening 551, the lower end portion 529 also extends through the opening 585 defined by the eye-bolt 563. The shaft 564 of the eye-bolt 563 includes a threaded end portion 587 that projects outwardly from a boss 589 provided on the second portion 502 of the clamp 532. By tightening a fastener such as a nut 591 (e.g., a wing nut) on the threaded end portion 578 of the eye-bolt 563, the first and second portions 500, 502 of the clamp 532 are drawn together to cause a handle of the elongated item 522 to be clamped between the portions 500, 502.

Tightening of the nut 591 also causes the eye-bolt 563 to frictionally retain the pivot pin 534 within the opening 551. For example, as the nut 591 is tightened, the lower end portion 529 of the pivot pin 534 (which has been pre-inserted through the pivot opening 551 and the opening 585) is forced against surface 594 (see FIG. 10) of the first portion 500 of the clamp 532. In this way, the lower end portion 529 of the pivot pin 534 is clamped within the opening 551 to prevent the lower end portion 529 of the pivot pin 534 from being unintentionally pulled from the pivot opening 551. In one embodiment, friction prevents the lower end portion 529 of the pivot pin 534 from being unintentionally removed from the pivot opening 551, but still allows the lower end portion 529 of the pivot pin 534 to be pivoted within the pivot opening 551 to allow pivotal movement of the arm cradle 528 relative to the clamp 532. In other embodiments, the lower end portion 529 of the pivot pin 534 may include one or more notches for receiving the eye portion 584 when the eye-bolt 563 is tightened.

In use, the eye-bolt 563 provides a quick connect/disconnect function. For example, by slightly loosening the nut 591, the arm cradle 528 can be readily pulled upwardly to easily remove the lower end portion 529 of pivot pin 534 from the pivot opening 551 of the clamp 532. The slight loosening of the nut 591 allows the arm cradle 528 to be disconnected from the clamp 532, but still keeps the clamp 532 firmly clamped about the handle of the elongated item 522. In this way, the arm cradle 528 can be quickly removed and moved to another clamp 532 provided on another elongated item. This type of arrangement is ideally suited for applications such as serious anglers that have multiple rods. For such a use, separate clamps 532 can be mounted on each of the anglers rods. As the angler desires to switch rods, the cradle 528 can be quickly disconnected from a first rod and quickly reinserted into the clamp 532 of a second rod. Because the clamps 532 are relatively small, the clamps 532 do not interfere with storing the rods in a conventional rod locker.

Figure 11:
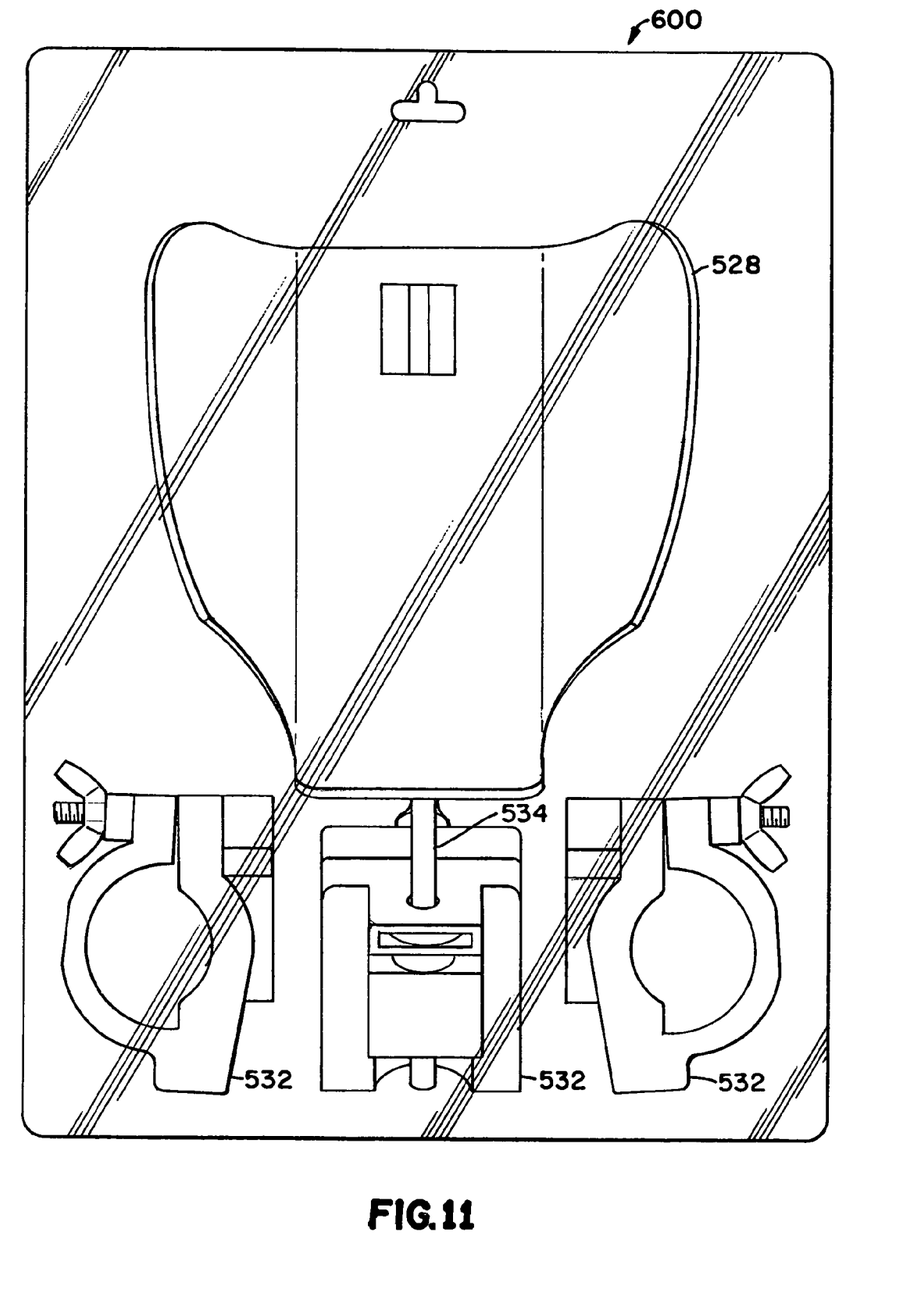
FIG. 11 is a plan view of a kit in accordance with the principles of the present disclosure, the kit includes an arm support device and multiple couplers.

FIG. 11 shows a kit 600 having features that are examples of inventive aspects of the present disclosure. The kits shows an arm cradle 528 and corresponding pivot pin 534 mounted in packaging along with a plurality of clamps 532. In the depicted embodiment, three clamps 532 are shown mounted within the packaging. The clamps 532 each include their own corresponding eye-bolts and wing nuts. However, it will be appreciated that more or fewer than three of the clamps could be sold in the kit.

In the depicted embodiment, the packaging is shown as a blister pack having a cardboard backing and a plastic layer that mounts over the arm cradle 528 and the clamps 532 to secure the components to the cardboard backing. In other embodiments, the various components of the kit could be included a bag, a box, or other type of conventional packaging. Mounting instructions and use instructions can be printed on packaging (e.g., on the cardboard backing).

With regard to the foregoing description, changes may be made in detail, especially with regard to the shape, size and arrangement of the parts. It is intended that the specification and depicted aspects be considered elective only and not limiting with respect to the broad underlying concepts of the present disclosure.

I claim:

1. An arm support device for use with an elongated item having a handle, the arm support device comprising:
   a coupler adapted to be coupled to the handle, the coupler defining a pivot opening;
   an arm support positioned above the coupler;
   a pivot pin that connects the arm support to the coupler, the pivot pin being fixedly connected to the arm support such that the arm support can not pivot relative to the pivot pin, the pivot pin including a lower portion that extends downwardly from the arm support to the coupler, the lower portion of the pivot pin defining a pivot axis about which the arm support pivots relative to the coupler, the lower portion of the pivot pin including first threads that mate with corresponding second threads provided within the pivot opening, wherein the first threads ride along the second threads when the arm support is pivoted about the pivot axis, and wherein when the arm support and the pivot pin are pivoted together in a first rotational direction about the pivot axis the interaction of the first and second threads causes the arm support to be raised relative to the coupler and wherein when the arm support and the pivot pin are pivoted together in a second rotational direction about the pivot axis the interaction of the first and second threads causes the arm support to be lowered relative to the coupler; and wherein the coupler includes a clamp defining a receptacle for receiving the handle of the elongated item, the clamp including a top side, a bottom side, a left side, a right side, a front side and a back side, the receptacle extending through the clamp from the front side to the back side, wherein the arm support includes an arm cradle having a base portion and opposing left and right side walls that define an upwardly facing channel having an open top side, an open front end and an open rear end, the channel having a first dimension and a second dimension, the second dimension of the channel extending from the left side wall to the right side wall, and the first dimension extending from the open front end to the open rear end of the channel, wherein the pivot axis is offset to the left or the right of the receptacle and is positioned at a location adjacent the open front end of the arm cradle channel, and wherein the first dimension of the channel extends generally radially outwardly from the pivot axis.

2. The arm support device of claim 1, wherein the base portion of the channel inclines upwardly from the clamp as the base portion extends along the first dimension from the open front end to the open rear end of the channel.

3. The arm support device of claim 2, wherein the pivot axis is positioned in front of the open front end of the arm cradle.

4. An arm support device for use with an elongated item having a handle, the arm support device comprising:
a coupler adapted to be coupled to the handle, the coupler defining a pivot opening, the coupler also defining a fastener opening that extends across the pivot opening;
an arm support positioned above the coupler; and
a pivot pin that connects the arm support to the coupler, the pivot pin including a lower portion that extends downwardly from the arm support to the coupler, the lower portion of the pivot pin defining a pivot axis about which the arm support pivots relative to the coupler, the lower portion of the pivot pin being pivotally received within the pivot opening of the coupler such that the lower portion of the pivot pin pivots within the pivot opening to allow the arm support to pivot relative to the coupler; and
a fastener mounted within the fastener opening of the coupler for preventing the lower portion of the pivot pin from unintentionally being removed from the pivot opening while allowing the lower portion of the pivot pin to pivot about the pivot axis within the pivot opening wherein the fastener includes an eye-bolt having an eye-portion that defines a fastener opening through which the lower portion of the pivot pin extends when the lower portion of the pivot pin is positioned within the pivot opening of the coupler, wherein the pivot axis extends though the fastener opening defined by the eye-portion of the eye-bolt, and wherein the fastener opening includes a bore portion for receiving a shaft of the eye-bolt, and a slot portion for receiving the eye-portion of the eye-bolt, the slot portion having an enlarged width as compared to the bore portion.

5. The arm support device of claim 4, wherein the fastener clamps the lower portion of the pivot pin within the pivot opening.

6. The arm support device of claim 4, wherein the coupler includes a clamp including first and second clamp portions between which is defined a receptacle for receiving the handle of the elongated item, the first and second clamp portions being joined by a living hinge at a location below the receptacle, and the eye-bolt passing through the first and second clamp portions at a location above the receptacle.

7. The arm support device of claim 6, wherein the pivot opening of the coupler is oriented in an upright direction and is defined though the first clamp portion.

8. An arm support device for use with an elongated item having a handle, the arm support device comprising:
a coupler adapted to be coupled to the handle, the coupler defining a pivot opening, the coupler also defining a fastener opening that extends across the pivot opening;
an arm support positioned above the coupler; and
a pivot pin that connects the arm support to the coupler, the pivot pin including a lower portion that extends downwardly from the arm support to the coupler, the lower portion of the pivot pin defining a pivot axis about which the arm support pivots relative to the coupler, the lower portion of the pivot pin being pivotally received within the pivot opening of the coupler such that the lower portion of the pivot pin pivots within the pivot opening to allow the arm support to pivot relative to the coupler; and
a fastener mounted within the fastener opening of the coupler for preventing the lower portion of the pivot pin from unintentionally being removed from the pivot opening while allowing the lower portion of the pivot pin to pivot about the pivot axis within the pivot opening wherein the fastener includes an eye-bolt having an eye-portion that defines a fastener opening through which the lower portion of the pivot pin extends when the lower portion of the pivot pin is positioned within the pivot opening of the coupler, wherein the pivot axis extends though the fastener opening defined by the eye-portion of the eye-bolt, wherein the coupler includes a clamp including first and second clamp portions between which is defined a receptacle for receiving the handle of the elongated item, the first and second clamp portions being joined by a living hinge at a location below the receptacle, and a shaft of the eye-bolt passing through the first and second clamp portions at a location above the receptacle, wherein the eye-bolt is adapted to tighten the clamp about the handle of the elongated item.

9. The arm support device of claim 8, wherein the pivot opening of the coupler is oriented in an upright direction and is defined though the first clamp portion.

10. The arm support device of claim 4, wherein the arm support includes a forearm receiving member defining a channel having a first dimension that extends from an open front end to an open rear end of the channel, the first dimension being adapted to be generally parallel to a user's forearm when the user's forearm is positioned within the channel, and wherein the first dimension of the forearm receiving member extends generally radially outwardly from the pivot axis.

11. The arm support device of claim 10, wherein the channel inclines upwardly from the coupler as the channel extends along the first dimension from the open front end to the open rear end.

12. The arm support device of claim 11, wherein the pivot pin includes a one piece member having an upper portion secured to the forearm receiving member and the lower portion received within a pivot opening defined by the coupler, and wherein the pivot pin defines an obtuse angle between the upper and lower portions.

13. The arm support device of claim 4, wherein the coupler defines a receptacle for receiving the handle of the elongated item, wherein the arm support includes an arm cradle defining a channel that opens in an upward direction, the arm cradle including a bottom base portion and opposing, first and second spaced-apart side walls that extend upwardly from the bottom base portion, the bottom base portion and the first and second opposing, spaced-apart side walls cooperating to define the channel of the arm cradle, the channel having an open front end and an open rear end, wherein the bottom base portion of the arm cradle inclines upwardly from the coupler as the channel extends from the open front end to the open rear end, and wherein the channel of the arm cradle defining a central axis that extends from the open front end to the open rear end of the channel and that intersects the pivot axis of the pivot pin.

14. The arm support device of claim 4, wherein the coupler includes a clamp defining a receptacle for receiving the handle of the elongated item, the clamp including a top side, a bottom side, a left side, a right side, a front side and a back side, the receptacle extending through the clamp from the front side to the back side, wherein the arm support includes an arm cradle having a base portion and opposing left and right side walls that define an upwardly facing channel having an open top side, an open front end and an open rear end, the channel having a first dimension and a second dimension, the second dimension of the channel extending from the left side wall to the right side wall, and the first dimension extending from the open front end to the open rear end of the channel, wherein the pivot axis is offset to the left or the right of the receptacle and is positioned at a location adjacent the open front end of the arm cradle channel, and wherein the first dimension of the channel extends generally radially outwardly from the pivot axis.

15. The arm support device of claim 4, wherein the pivot pin includes an upper portion that is fixedly connected to the arm support such that the arm support can not pivot relative to the pivot pin, and wherein the upper portion of the pivot pin is aligned at an oblique angle relative to the lower portion of the pivot pin.

16. The arm support device of claim 4, wherein by loosening the fastener the pivot pin can be axially slid from the pivot opening without requiring the fastener to be completely removed from the fastener opening.

* * * * *